(12) United States Patent
Bugenhagen

(10) Patent No.: US 8,306,030 B1
(45) Date of Patent: Nov. 6, 2012

(54) VECTOR BASED SESSION SECURITY

(75) Inventor: Michael K. Bugenhagen, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1083 days.

(21) Appl. No.: 11/385,405

(22) Filed: Mar. 21, 2006

(51) Int. Cl.
*H04L 12/28* (2006.01)

(52) U.S. Cl. ........................... 370/394; 370/464

(58) Field of Classification Search .................. 370/394, 370/464, 465, 474, 536

See application file for complete search history.

(56) References Cited

U.S. PATENT DOCUMENTS

| | | | |
|---|---|---|---|
| 6,134,246 A * | 10/2000 | Cai et al. ................. | 370/474 |
| 6,470,015 B1 * | 10/2002 | Koga et al. .............. | 370/395.1 |
| 7,403,992 B2 * | 7/2008 | Tilander et al. .......... | 709/224 |
| 2005/0286522 A1 * | 12/2005 | Paddon et al. ........... | 370/389 |
| 2006/0031847 A1 * | 2/2006 | Macdonald et al. ...... | 719/316 |
| 2007/0140240 A1 * | 6/2007 | Dally et al. .............. | 370/389 |

* cited by examiner

*Primary Examiner* — Anh-Vu Ly
*Assistant Examiner* — Matthew Hopkins

(57) ABSTRACT

A communication system comprises an origination system configured to transmit session traffic, a traffic processing system configured to receive the session traffic from the origination system, multiplex the session traffic to virtual channels based on a plurality of vectors, transmit the plurality of vectors to a destination system, and transmit the session traffic over the virtual channels to the destination system, and a destination system configured to receive the session traffic and de-multiplex the session traffic based on the plurality of vectors.

20 Claims, 5 Drawing Sheets

VECTOR BASED SESSION SECURITY

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The field of the invention relates to telecommunications, an in particular, to providing traffic security utilizing a dynamic vector based approach to traffic segmentation and assembly.

2. Description of the Prior Art

Session communications are often times transmitted in the form of packets having a network address, a session identifier, and a payload. Communications are frequently created in one protocol but require transport within a different protocol. In such a case, session communications in the form of packets are segmented into smaller packets, packaged sequentially into a packet data unit of another protocol, transmitted, and reassembled at the receiving end. Sometimes, individual packets are simply wrapped within another protocol and transmitted. The network address of an original packet is typically used to address the new packet data units. The ordered sequence with which the new packet data units are filled with the smaller packets creates easily identifiable data patterns that allow hackers to recreate the original packets, and thus snoop on session communications.

Often times, packets from multiple users are multiplexed onto a single VC. In these circumstances, the smaller packets of each original packet are not transmitted sequentially, but are rather interspersed with other smaller packets from other original packets. While this increases the difficulty of recreating sessions, with a reasonable amount of effort the original transmissions can be recreated by sorting the packet data units based on the network addresses that are readily identifiable within the packet data units.

Other times, packets from a single user are multiplexed over multiple VCs. In such a case, all the smaller packets of an original packet are assembled into data units assigned to the same VC. In addition, while the original packet stream may not be transmitted sequentially, all the smaller packets of each individual packet are still transmitted sequentially. Thus, the various VCs can still be illicitly monitored and the original transmissions recreated by sorting the packet data units by network address patterns and payload patterns identified within the packet data units.

SUMMARY OF THE INVENTION

An embodiment of the invention helps solve the above problems and other problems by providing improved traffic security by segmenting packets into segments, assembling the segments into new data packet units in a non-sequential order defined by a first vector, assigning the new data packet units to virtual channels based on a second vector, and transmitting the new data packet units over the virtual channels. The non-sequential order in which the segments are loaded into the packet data units result in data streams within the virtual channels that defy pattern based sorting of the type found problematic in the prior art.

In an embodiment of the invention, a method of operating a traffic security system comprises receiving session traffic from an origination system, multiplexing the session traffic to virtual channels based on a plurality of vectors, transmitting the plurality of vectors to a destination system, transmitting the session traffic over the virtual channels to the destination system, and de-multiplexing the session traffic based on the plurality of vectors.

In an embodiment of the invention, the session traffic comprises a plurality of packets associated with a plurality of sessions and wherein the method further comprises segmenting each of the packets into segments wherein each of the segments has a sequence order in an original sequence of the segments, assembling the segments into data units based a first vector of the plurality of vectors wherein the first vector defines the data units based on the session and sequence order of each of the segments, determining virtual channels for the data units based on a second vector of the plurality of vectors wherein the second vector associates the virtual channels with the data units, and transmitting the data units with identifiers identifying the virtual channels.

In an embodiment of the invention, the method includes assembling the segments in a non-sequential order into the data units based on the first vector.

In an embodiment of the invention, the method includes generating the first vector, transmitting a message to the destination indicating the first vector, and transmitting the data units to the destination.

In an embodiment of the invention, the method includes, at the destination, receiving the message and the data units, segmenting the data units into new segments, and assembling the new segments into new packets based on the first vector and the second vector.

In an embodiment of the invention, the method includes changing the plurality of vectors at a predetermined rate.

In an embodiment of the invention, the method includes changing the plurality of vectors in response to a security event.

In an embodiment of the invention, the session traffic comprises voice traffic.

In an embodiment of the invention, the session traffic comprises video traffic.

In an embodiment of the invention, a communication system comprises an origination system configured to transmit session traffic, a traffic processing system configured to receive the session traffic from the origination system, multiplex the session traffic to virtual channels based on a plurality of vectors, transmit the plurality of vectors to a destination system, and transmit the session traffic over the virtual channels to the destination system, and a destination system configured to receive the session traffic and de-multiplex the session traffic based on the plurality of vectors.

In an embodiment of the invention, a traffic processing system comprises an interface configured to receive session traffic from an origination system, a processing system configured to multiplex the session traffic to virtual channels based on a plurality of vectors, and the interface further configured to transmit the plurality of vectors and the session traffic over the virtual channels to a destination system.

BRIEF DESCRIPTION OF THE DRAWINGS

The same reference number represents the same element on all drawings.

DETAILED DESCRIPTION OF THE PREFERRED EMBODIMENT

FIGS. 1-6 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
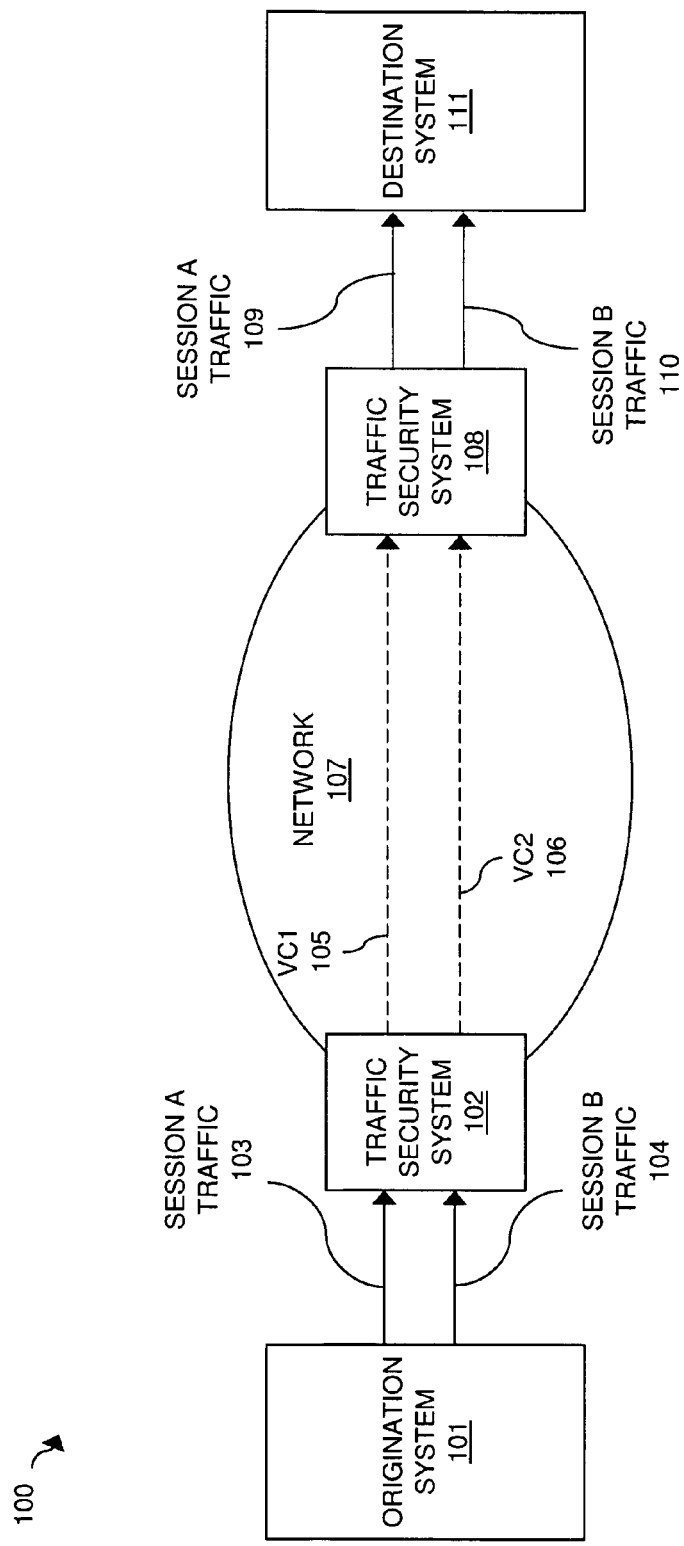
FIG. 1 illustrates a communication system in an embodiment of the invention.

FIG. 1 illustrates communication system 100 in an embodiment of the invention. Communication system 100 provides improved traffic security by segmenting packets into segments, assembling the segments into new data packet units in a non-sequential order defined by a first vector, assigning the new data packet units to virtual channels based on a second vector, and transmitting the new data packet units over the virtual channels. The non-sequential order in which the segments are loaded into the packet data units results in data streams within the virtual channels that defy pattern based sorting of the type found problematic in the prior art.

Communication system 100 includes origination system 101, traffic security system (TSS) 102, network 107, traffic security system (TSS) 108, and destination system 111. Origination system 101 is in communication with TSS 102. TSS 102 is in communication over network 107 with TSS 108. TSS 108 is in communication with destination system 111.

In this embodiment, FIG. 1 illustrates session A traffic flow 103 and session B traffic flow 104. Sessions A and B could be any type of packet communication sessions, such as a voice, video, or data session. Origination system 101 could be in communication with TSS 102 over any type of packet communication link well known in the art, such as a local area network (LAN), wide area network (WAN), metro area network (WAN), Ethernet, fast Ethernet, gig Ethernet, or digital subscriber line (DSL), as well as other types of packet communication links.

Further in this embodiment, FIG. 1 illustrates virtual channel 1 (VC1) 105 and virtual channel 2 (VC2) 106 through network 107 between TSS 102 and TSS 108. VC1 105 and VC2 106 could also be referred to as virtual paths, packet tunnels, or the like. Virtual channels, paths, and packet tunnels are well known in the art. FIG. 1 also illustrates session A traffic flow 109 and session B traffic flow 110 between TSS 108 and destination system 111. It should be understood that FIG. 1 illustrates the flow of session traffic A and B as flowing from origination system 101 to destination system 111 for illustrative purposes only and that session traffic A and B could flow in a bi-directional manner.

Network 107 could be any type of network or collection of networks capable of carrying session traffic through VC1 105 and VC2 106. Networks capable of supporting virtual connections are well known in the art. TSS 102 and 108 could comprise any type of system capable of multiplexing session flows to virtual channels. TSS 102 and 108 could include, for example, segmentation and reassembly (SAR) modules or systems. Origination system 101 could be any type of system or collection of systems capable of originating session traffic. It should be understood that origination system 101 could also be an intermediate element along a session path. Destination system 111 could be any type of system or collection of systems capable of terminating session traffic. It should be understood that destination system 11 could also be an intermediate element along a session path. The terms origination and destination are used herein for illustrative purposes and are not meant to define the endpoints of a session path. It should also be understood that communication system 100 could include other elements not shown for purposes of clarity.

Figure 2A:
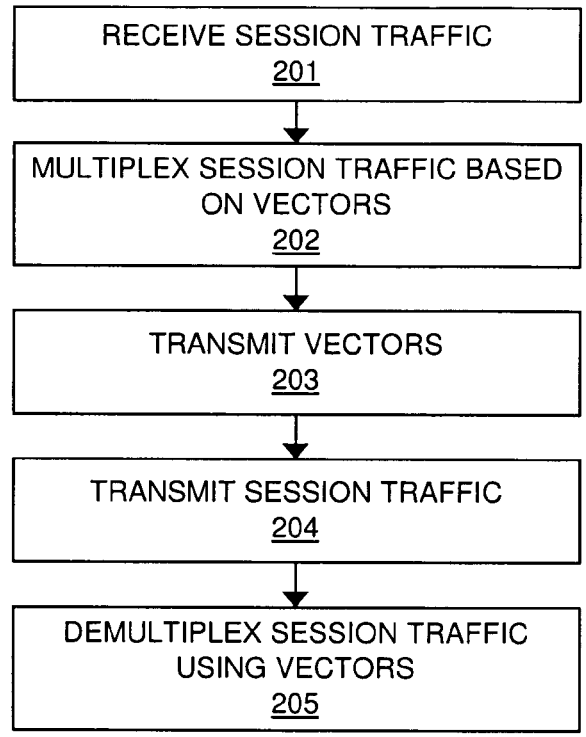
FIG. 2A illustrates a process in an embodiment of the invention.

FIG. 2A illustrates a process in an embodiment of the invention that could be performed by either TSS 102 or TSS 108. In this embodiment, the operation of TSS 102 is discussed for the sake of clarity.

To begin, TSS 102 receives session A traffic 103 and session B traffic 104 from origination system 101 (Step 201). Session A traffic 103 and session B traffic 104 could be in the form of packet communications. Session A traffic 103 and session B traffic 104 could carry multiple session, or could be comprised of individual sessions. Session A traffic 103 could be distinguished from session B traffic 104 by user, session type, or traffic type, or the like. TSS 102 multiplexes session A traffic 103 and session B traffic 104 to VC1 105 and VC2 106 based on a plurality of vectors (Step 202). TSS 102 then transmits the vectors to TSS 108 (Step 203). It should be understood that TSS 102 could transmit the vectors periodically and not with every transmission of session traffic. It should also be understood that the vectors could be transmitted in a secure manner, such by encrypting the vectors or transmitting the vectors over an encrypted link. TSS 102 then transmits the multiplexed traffic over VC1 105 and VC2 106 to TSS 108 (Step 204).

TSS 108 receives and de-multiplexes the session traffic using the plurality of vectors (Step 205). TSS 108 then transmits session A traffic 109 and session B traffic 110 to destination system 111.

In the aggregate, traffic flows are comprised of multiple packets. Thus, it should be understood that the process illustrated in FIG. 2A could be repeated on a per-packet basis. Depending upon the capacity of TSS 102 or TSS 108, multiple packets could be processed simultaneously.

Figure 2B:
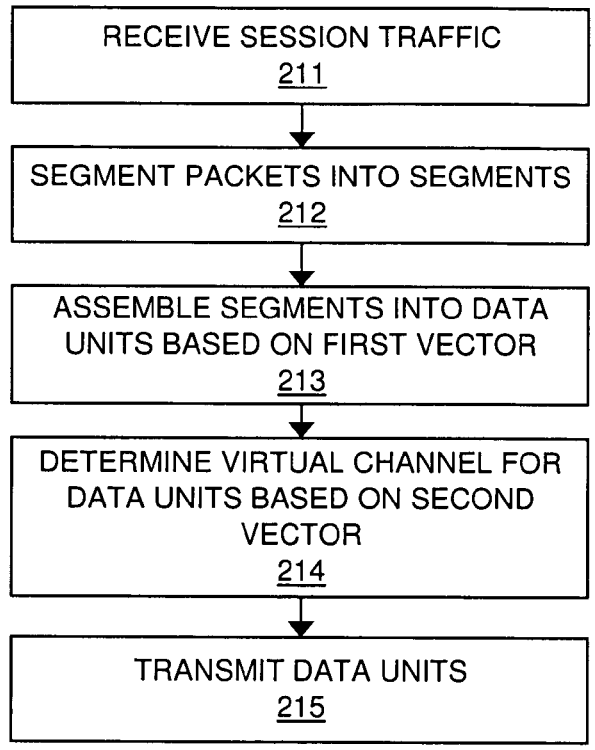
FIG. 2B illustrates a process in an embodiment of the invention.

FIG. 2B illustrates a multiplexing process in an embodiment of the invention that could be performed by either TSS 102 or TSS 108. In this embodiment, the operation of TSS 102 is discussed for the sake of clarity.

Figure 3:
FIG. 3 illustrates a packet communication in an embodiment of the invention.

To begin, TSS 102 receives session A traffic 103 and session B traffic 104 in the form of packet communications (Step 211). FIG. 3 illustrates an example of a packet communication 301 of which session A traffic 103 and session B traffic 104 could be comprised. Packet communications such as packet communication 301 are well known in the art. Packet 301 includes a header section, a session identifier section, and a payload section. The different sections of packet 301 could be of uniform size, although it should be understood that the sections could also vary in size. The header section could indicate header information, such as a destination network address for destination system 111. The header section could also indicate a network address for origination system 101. The session section could indicate session information, such as the type of session and a session identifier, as well as other types of session information. The payload section could include payload information, such as user communications. Examples of user communications could include voice, video, or data information.

Figure 4:
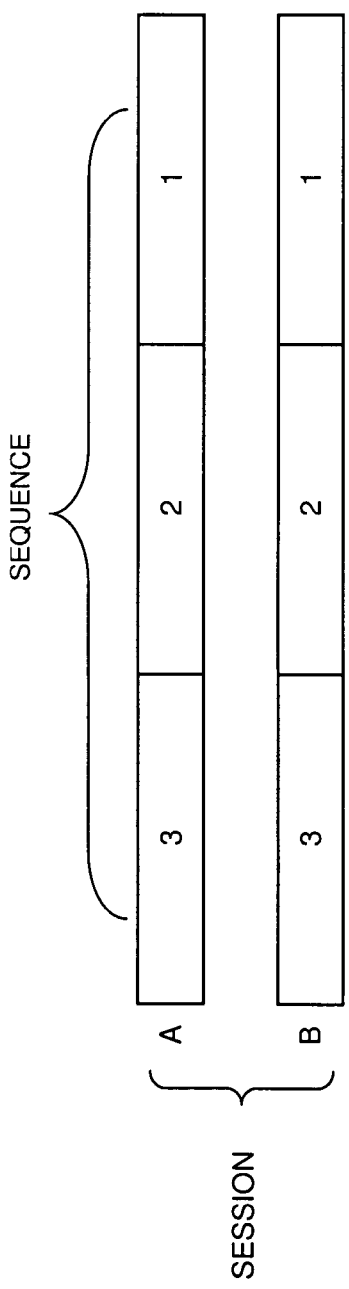
FIG. 4 illustrates packet segments in an embodiment of the invention.

Next, TSS 102 next segments the packets into segments (Step 212). FIG. 4 illustrates two segmented packets for sessions A and B. Each packet segment could be described by sequence and session. In this example, each packet could be segmented into three segments with each of the three segments having a sequence in the original packet. Each segment can therefore be defined by sequence and session. The six resulting segments can be described as segments 1A, 2A, 3A, 1B, 2B, and 3B. In this example, the segments correspond to the header, session, and payload sections illustrated by packet communication 301. However, it should be understood that the segments need not correspond to the sections of packet communication 301. For example, the header section itself could be segmented into multiple segments. For instance, the header section could include subsets of header information, such as origination network address information, termination network address information, and port information. Thus, the header section and could be segmented by subset.

Figure 5:
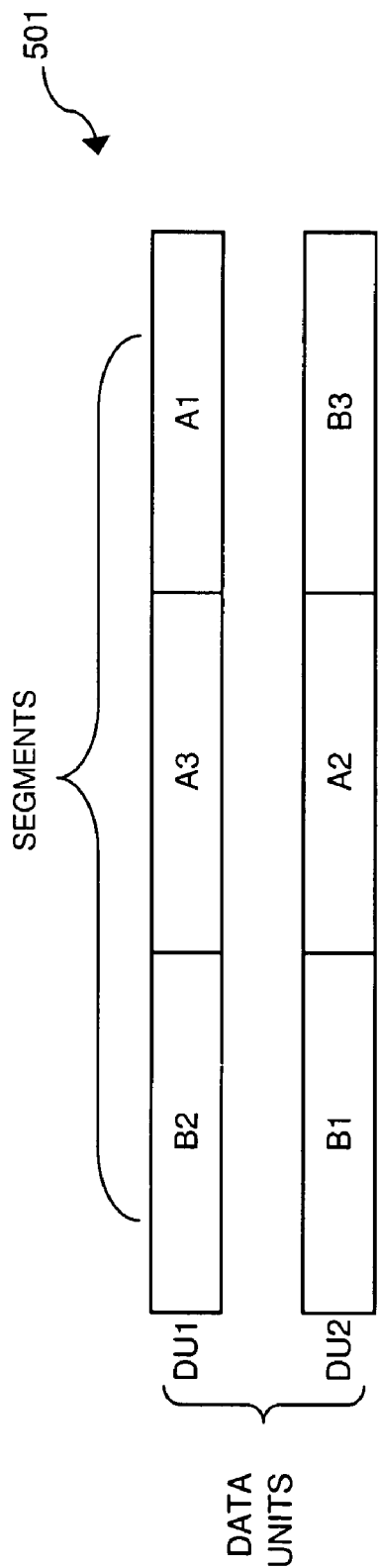
FIG. 5 illustrates a data unit vector in an embodiment of the invention.

TSS 102 assembles the segments into data units based on a data unit vector (Step 213). FIG. 5 illustrates a data unit vector 501 that defines the data units that are wrapped within and transported over virtual channels VC1 and VC2. Data unit vector 501 is defined by segment and data unit. The segments identified by vector 501 correspond to the segments illustrated in FIG. 4. In this example, data unit 1 (DU1) includes segments A1, A3, and B2. Data unit 2 (DU2) includes segments B3, A2, and B1.

Figure 6:
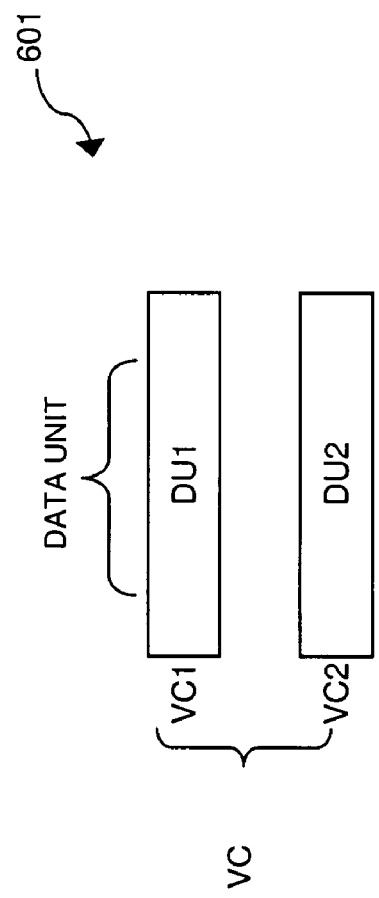
FIG. 6 illustrates a virtual channel vector in an embodiment of the invention.

Upon assembling the segments into data units, TSS 102 determines a virtual channel for each data unit based on a virtual channel vector (Step 214). FIG. 6 illustrates a virtual channel vector 601 that defines which data units are assigned to which virtual channels. In this example, DU1 is assigned to VC1 and DU2 is assigned to VC2.

Lastly, TSS 102 transmits the data units over the virtual channels to TSS 108 (Step 215). In this example, DU1 is addressed with VC1 and includes a payload of segments A1, A3, and B2. DU2 is addressed with VC2 and includes a payload of segments B3 A2, and B1.

At TSS 108, the new data units DU1 and DU2 arrive and are de-multiplexed based on data unit vector 501 and virtual channel vector 601. In particular, the data units are re-segmented and reassembled into the original packets. The resulting session A traffic 109 and session B traffic 110 is transmitted to destination system 111.

In an embodiment, either data unit vector 501 or virtual channel vector 601, or both, could be periodically changed. For example, virtual channel vector 601 could be changed at a predefined period to assign DU1 to VC2 and DU2 to VC1. In this manner, session traffic can be further protected. In another example, data unit vector 501 could be changed to alter the position of segments in each data unit and the assignment of the segments to the data units. Such alternations could be performed on a periodic basis, in response to a security event, or in response to a time of day or day of the week, as well as other pre-defined periods within which it would be desirable to alter the vectors.

Advantageously, communication system 100 provides improved traffic security by segmenting packets into segments, assembling the segments into new data packet units in a non-sequential order defined by data unit vector 501, assigning the new data packet units to virtual channels based on virtual channel vector 601, and transmitting the new data packet units over the virtual channels. The non-sequential order in which the segments are loaded into the packet data units result in data streams within the virtual channels that defy pattern based sorting of the type found problematic in the prior art.

What is claimed is:

1. A method of operating a traffic security system, the method comprising:
    receiving session traffic from an origination system wherein the session traffic comprises a plurality of packets associated with a plurality of sessions;
    segmenting each of the packets of the plurality of packets into segments and assembling the segments into data units based on a first vector of a plurality of vectors resulting in segmented session traffic, wherein each of the segments has a sequence order in an original sequence of the segments and the first vector defines the data units based on the session and sequence order of each of the segments;
    multiplexing the segmented session traffic to virtual channels resulting in multiplexed session traffic, wherein the segmented session traffic is multiplexed based on a second vector of the plurality of vectors that associates the virtual channels with the data units;
    transmitting the plurality of vectors to a destination system;
    transmitting the multiplexed session traffic over the virtual channels to the destination system by transmitting each data unit over a virtual channel associated with the data units based on the second vector of the plurality of vectors; and
    de-multiplexing and de-segmenting the multiplexed session traffic based on the plurality of vectors.

2. The method of claim 1 wherein the first vector defines the data units by defining a first data unit comprising a first segment of a packet and defining a second data unit comprising a second segment of the packet.

3. The method of claim 1 further comprising assembling the segments in a non-sequential order into the data units based on the first vector.

4. The method of claim 1 further comprising generating the first vector, transmitting a message to the destination indicating the first vector, and transmitting the data units to the destination.

5. The method of claim 4 further comprising at the destination, receiving the message and the data units, wherein de-multiplexing and de-segmenting the multiplexed session traffic comprises segmenting the data units into new segments, and assembling the new segments into new packets based on the first vector and the second vector.

6. The method of claim 1 further comprising changing the plurality of vectors at a predetermined rate.

7. The method of claim 1 further comprising changing the plurality of vectors in response to a security event.

8. The method of claim 1 wherein the session traffic comprises voice traffic.

9. The method of claim 1 wherein the session traffic comprises video traffic.

10. A communication system comprising:
- an origination system configured to transmit session traffic wherein the session traffic comprises a plurality of packets associated with a plurality of sessions;
- a traffic processing system configured to receive the session traffic from the origination system, segment each of the packets of the plurality of packets into segments and assemble the segments into data units based on a first vector of a plurality of vectors resulting in segmented session traffic, wherein each of the segments has a sequence order in an original sequence of the segments and the first vector defines the data units based on the session and sequence order of each of the segments, multiplex the segmented session traffic to virtual channels resulting in multiplexed session traffic, wherein the segmented session traffic is multiplexed based on a second vector of the plurality of vectors that associates the virtual channels with the data units, transmit the plurality of vectors to a destination system, and transmit the multiplexed session traffic over the virtual channels to the destination system by transmitting each data unit over a virtual channel associated with the data units based on the second vector of the plurality of vectors; and
- the destination system configured to receive the multiplexed session traffic and de-multiplex and de-segment the multiplexed session traffic based on the plurality of vectors.

11. The system of claim 10 wherein the first vector defines the data units by defining a first data unit comprising a first segment of a packet and defining a second data unit comprising a second segment of the packet.

12. The system of claim 10 wherein the traffic processing system is further configured to assemble the segments in a non-sequential order into the data units based on the first vector.

13. The system of claim 10 wherein the traffic processing system is further configured to generate the first vector, transmit a message to the destination system indicating the first vector, and transmit the data units to the destination system.

14. The system of claim 13 wherein the destination system is further configured to receive the message and the data units, and wherein the destination system, to de-multiplex and de-segment the multiplexed session traffic, segments the data units into new segments, and assembles the new segments into new packets based on the first vector and the second vector.

15. The system of claim 10 wherein the traffic processing system is further configured to change the plurality of vectors at a predetermined rate.

16. The system of claim 10 wherein the traffic processing system is further configured to change the plurality of vectors in response to a security event.

17. The system of claim 10 wherein the session traffic comprises voice traffic.

18. The system of claim 10 wherein the session traffic comprises video traffic.

19. A traffic processing system comprising:
- an interface configured to receive session traffic from an origination system wherein the session traffic comprises a plurality of packets associated with a plurality of sessions;
- a processing system configured to segment each of the packets of the plurality of packets into segments and assembling the segments into data units based on a first vector of a plurality of vectors resulting in segmented session traffic, wherein each of the segments has a sequence order in an original sequence of the segments and the first vector defines the data units based on the session and sequence order of each of the segments, multiplex the segmented session traffic to virtual channels resulting in multiplexed session traffic, wherein the segmented session traffic is multiplexed based on a second vector of the plurality of vectors that associates the virtual channels with the data units; and
- the interface further configured to transmit the plurality of vectors and the multiplexed session traffic over the virtual channels to a destination system by transmitting each data unit over a virtual channel associated with the data units based on the second vector of the plurality of vectors.

20. The traffic processing system of claim 19 wherein the processing system is further configured to assemble the segments in a non-sequential order into the data units based on the first vector.

* * * * *